D. HALDEMAN.
Harrow.
No. 12,415.
Patented Feb. 20, 1855.
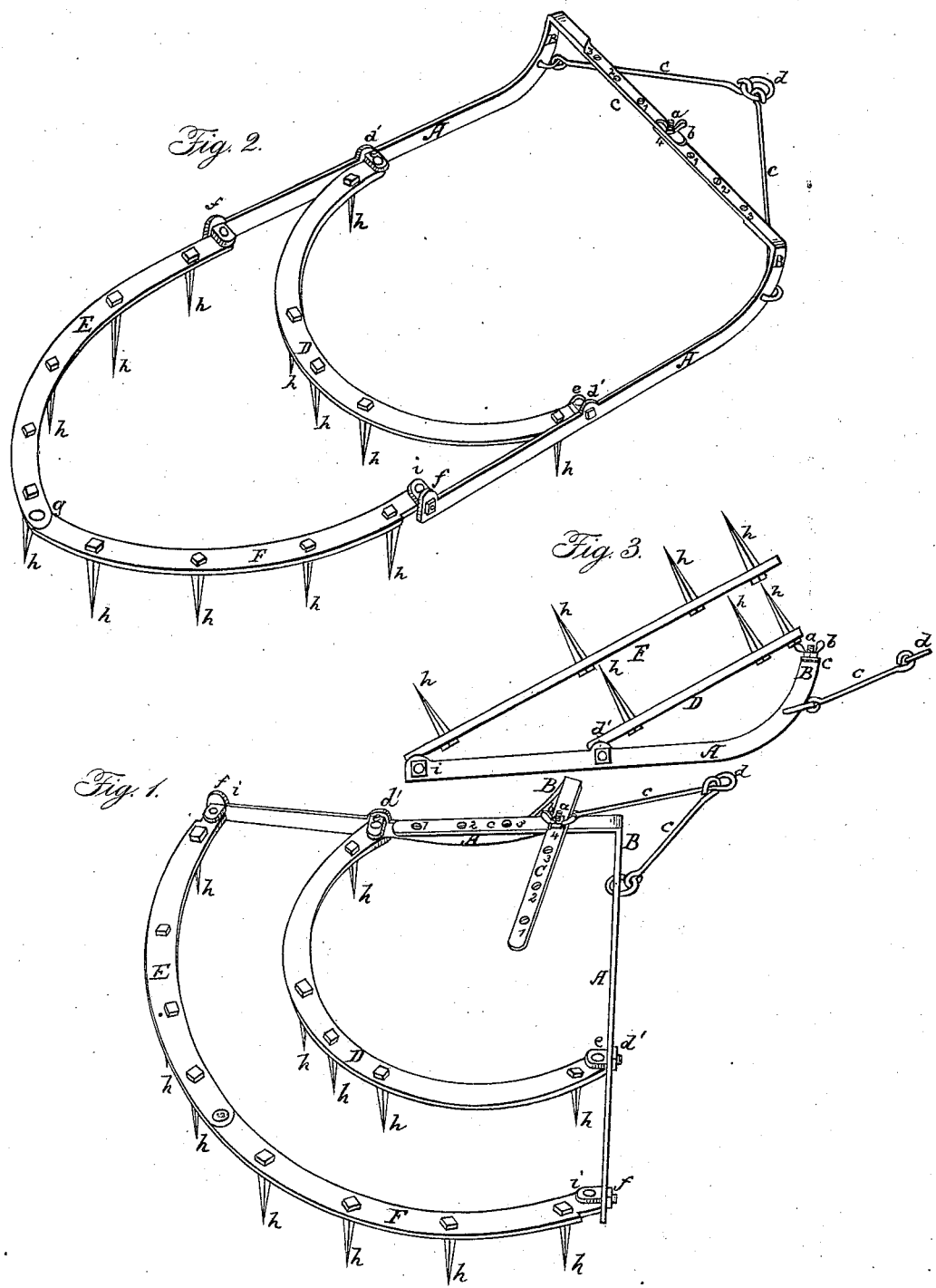

UNITED STATES PATENT OFFICE.

DANIEL HALDEMAN, OF MORGANTOWN, VIRGINIA.

IMPROVEMENT IN HARROWS.

Specification forming part of Letters Patent No. 12,415, dated February 20, 1855.

*To all whom it may concern:*

Be it known that I, DANIEL HALDEMAN, of Morgantown, in the county of Monongalia and State of Virginia, have invented certain new and useful Improvements in Harrows; and I do hereby declare the following to be a full, clear, and exact description of the same, reference being had to the accompanying drawings, making a part thereof, in which—

Figure 1 represents a perspective view of the harrow in one of its adjustable forms. Fig. 2 represents a perspective view of the same in another of its adjusted positions, and Fig. 3 represents a side elevation of the harrow folded up for the purpose of transporting it from place to place without allowing the teeth to drag or catch upon the ground.

Similar letters in the figures denote like parts.

The nature of my invention consists in so forming the frame of a harrow and hinging it together as that it may be readily adjusted to variable widths without materially changing its general form, and so that also it may be folded up and carried upon runner-shaped pieces constituting a part of the frame as not to allow the teeth to drag or catch upon the ground when transported or drawn from place to place.

To enable others skilled in the art to make and use my invention, I will proceed to describe the same with reference to the drawings.

A A are two runner-shaped pieces curved upward at their front ends, B, and each having an arm, C, provided with any suitable number of holes, 1, 2, 3, 4, &c., for the purpose of adjustment, and through which holes is passed a screw-bolt, $a$, with a thumb-nut, $b$, for holding it in adjustment. These arms C, when the harrow is at its narrowest adjustment, as in Fig. 2, lie one immediately in line with the other, and the runners and arms constitute what I term the front part of the frame, and have attached thereto the drag chains or rods $c\ c$, uniting in a ring or hook, $d$, to which the horses may be attached.

At about the center longitudinally of the runners A A are provided lugs or ears $d'\ d'$, in which are supported the shanks of the pieces $e\ e$, to which are pivoted respectively the ends of the segmental piece D, which forms one of the cross-pieces, as it were, of the frame. The pieces $e\ e$ so unite the runners and segmental piece as that the runners may be drawn together at their front ends, as shown in Fig. 1, in which case the said pieces move on the segmental piece, it being fixed, or so that the segmental piece may be turned up and thrown forward, so as to rest on the arms C, in which case the pieces $e\ e$ turn on their shanks in the lugs $d$, the runners remaining fixed and making a double joint.

At the rear of the runners A A are lugs $f\ f$, for supporting the pieces $i\ i$, in every respect like those $e\ e$ before described, and to which are respectively pivoted the ends of the two rear pieces, E F, which are of a curved form and hinged together at $g$. The pieces D E F may be called the cross-pieces of the frame, and are provided with teeth $h\ h$, of any suitable number or form.

I have said the curved piece D may be turned forward and rest on the arms A, in which case the points of the teeth will project upward. The united pieces E F may also be raised up and turned forward and rest, with its teeth projecting upward, on the teeth of the piece D. This being done, the whole weight is mounted on the runners A A, which rest on the ground, and the harrow may be drawn from field to field without the teeth dragging or catching, the machine forming its own truck, upon which it is conveyed from place to place. (Shown in Fig. 3.)

In Fig. 2 the harrow is represented at its narrowest adjustment, and in Fig. 1 at its widest adjustment. It has of course as many intermediate adjustments as there are sets of holes 1, 2, 3, 4, &c., in the arms C. As the harrow is widened out the arms C change their position, but still cross each other, so that the bolt passing through them will hold the harrow as set; but the general contour or shape of the harrow remains practically the same, the teeth remaining *en echelon* in all the various adjustments.

I purpose making the harrows of metal entirely, as being the most economical; but the frames may be of wood, or of wood and iron united. The pieces forming the hinged portion of the frame may, instead of passing through lugs or ears, pass through the frames themselves, and other double or universal joints than the one described may be used, so that either part of the frame may be used without requiring both to move, or so that it may possess the adjustable as well as the folding-up properties.

The harrow may be extended by the addition of other curved cross-pieces, if found essential, and each cross-piece by being hinged to the frame is free to adapt itself to the inequalities of the ground without in the least influencing or controlling the others, which may do the same.

Attempts may be made to violate my invention by separating the adjustability from the folding-up properties of the harrow, or by using them separately; but I should consider such attempts as palpable infringements of my rights, the separation of them not even involving mechanical skill, much less invention.

Having thus fully described the nature of my adjustable harrow, what I claim therein as new, and desire to secure by Letters Patent, is—

The so forming and hinging together of the frames or frame-pieces of a harrow as that it may be susceptible of such an adjustment as is herein represented, and so that it may be folded up and rest upon a portion of the frame, which forms a sled, upon which it may be conveyed from place to place, as described.

DANIEL HALDEMAN.

Witnesses:
  A. B. STOUGHTON,
  THOMAS UPPERMAN.